(12) United States Patent
Jones

(10) Patent No.: US 7,984,493 B2
(45) Date of Patent: Jul. 19, 2011

(54) DNS BASED ENFORCEMENT FOR CONFINEMENT AND DETECTION OF NETWORK MALICIOUS ACTIVITIES

(75) Inventor: Emanuele Jones, Dallas, TX (US)

(73) Assignee: Alcatel-Lucent, Paris (FR)

( * ) Notice: Subject to any disclaimer, the term of this patent is extended or adjusted under 35 U.S.C. 154(b) by 1511 days.

(21) Appl. No.: 11/186,866

(22) Filed: Jul. 22, 2005

(65) Prior Publication Data

US 2007/0033645 A1 Feb. 8, 2007

(51) Int. Cl.
*G06F 15/173* (2006.01)
*G06F 15/16* (2006.01)
*G06F 17/30* (2006.01)
*G06F 12/14* (2006.01)

(52) U.S. Cl. .......... 726/12; 709/225; 709/229; 713/188; 713/189; 726/14; 726/21; 726/28; 726/29

(58) Field of Classification Search .................. None
See application file for complete search history.

(56) References Cited

U.S. PATENT DOCUMENTS

| | | | |
|---|---|---|---|
| 2004/0039827 A1* | 2/2004 | Thomas et al. | 709/228 |
| 2004/0199763 A1* | 10/2004 | Freund | 713/154 |
| 2004/0249948 A1* | 12/2004 | Sethi et al. | 709/227 |
| 2005/0262248 A1* | 11/2005 | Jennings et al. | 709/228 |
| 2007/0204051 A1* | 8/2007 | Zhang | 709/230 |

OTHER PUBLICATIONS

Cisco NAC, The Development of the Self-Defending Network, Cisco Systems, 2005.
Alcatel Expands CrystalSec Security Framework to Address Security Threats That Disrupt Enterprise Business, Alcatel, 2005.
Whyte, D., DNS-Based Detection of Scanning Worms in an Enterprise Network, Aug. 2004.
David Whyte, et al., "DNS-based Detection of Scanning Worms in an Enterprise Network", Security Symposium, Feb. 4, 2005, XP002412148, the whole document.
David Whyte, et al., ARP-based Detection of Scanning Worms Within an Enterprise Network, Technical Report, Jan. 31, 2005, XP002412149, the whole document.
Nicholas Weaver, et al., "A Taxonomy of Computer Worms", ACM Workshop on Rapid Malcode, Oct. 2003, XP002412150, the whole document.

* cited by examiner

*Primary Examiner* — Nasser Moazzami
*Assistant Examiner* — Fatoumata Traore
(74) *Attorney, Agent, or Firm* — Kramer & Amado P.C.

(57) ABSTRACT

Malicious network activities do not make use of the Domain Name System (DNS) protocol to reach remote targets outside a local network. This DNS-based enforcement system for confinement and detection of network malicious activities requires that every connection toward a resource located outside the local network is blocked by default by the local enforcement box, e.g. a firewall or a proxy. Outbound connections are allowed to leave the local network only when authorized directly by an entity called the DNS Gatekeeper.

19 Claims, 3 Drawing Sheets

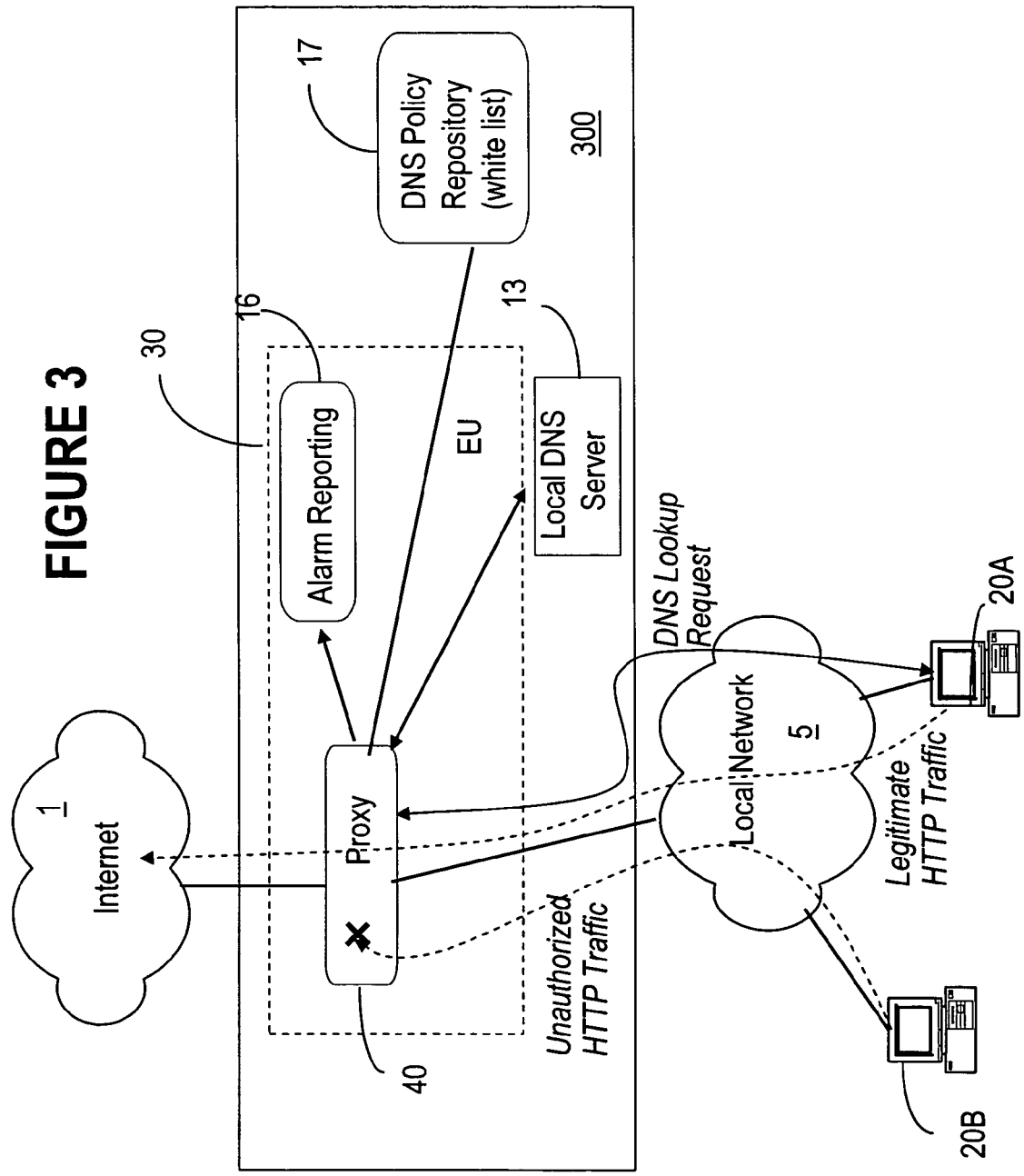

DNS BASED ENFORCEMENT FOR CONFINEMENT AND DETECTION OF NETWORK MALICIOUS ACTIVITIES

FIELD OF THE INVENTION

The invention is directed to communication networks and in particular to Domain Name System (DNS) based enforcement for confinement and detection of network malicious activities.

BACKGROUND OF THE INVENTION

The original Internet protocol, TCP/IP, was designed on the basis that system users would connect to the network for strictly legitimate purposes; as a consequence, no particular consideration was given to security issues. In recent years, however, the incidence of malicious attacks on the Internet has grown to alarming proportions. Among the various classes of attacks, one could mention denial of service (DoS) attacks, which involve blocking somebody's ability to use a given service on the network, and may take on a variety of forms, and often lead to a complete disruption of service for a targeted victim. Other threats include viruses, worms, system penetration, spoofing, data/network sabotage, data theft, flooding a victim with so much traffic that the victim's server cannot cope, etc.

A computer virus is a program or programming code that replicates itself by being copied or initiating its copying to another program, computer boot sector or document, which replicates across a network in various ways. A virus can be viewed as DoS attacks where the victim is not usually specifically targeted, but simply a host unlucky enough to get the virus. Depending on the particular virus, the denial of service can be hardly noticeable ranging all the way through disastrous. Viruses can be transmitted as attachments to an e-mail note or in a downloaded file, or be present on a diskette or CD. Some viruses wreak their effect as soon as their code is executed; other viruses lie dormant until circumstances cause their code to be executed by the computer. Some viruses are benign or playful in intent and effect and some can be quite harmful, erasing data or causing your hard disk to require reformatting.

A virus that replicates itself by resending itself as an e-mail attachment or as part of a network message is known as a worm. Worms use parts of the operating system that are automatic and usually invisible to the user. It is common for worms to be noticed only when their uncontrolled replication consumes system resources, slowing or halting other tasks. The worms operate by exploiting both known and previously unknown software vulnerabilities in applications and systems software and propagate rapidly across the network. By hijacking trusted applications such as web servers, mail transfer agents and log-in servers, which typically run with many global permission, worms can gain full access to system resources, and cause complete system compromise.

Worms and viruses plague today's data networks and they have been a problem for many years now (Morris worm, Code Red, etc). Unfortunately, these attacks are increasing in frequency, severity, and complexity due to the increasing speed and pervasiveness of broadband connections. These malicious network attacks can particularly harm enterprises and small office/home networks, by denying them the ability to serve their clients, which leads to loss of sales and advertising revenue; the patrons may also seek competing alternatives. It is also known that this type of networks may become exploited and then pose as sources of further malicious activities. It is also known that worms could be much more malicious then have been currently seen. Thus, it is possible to construct hyper-virulent active worms, capable of infecting all vulnerable hosts in approximately 15 minutes to an hour and could cause maximum damage before people could respond. These worms can be built by using optimized scanning routines, hitlist scanning for initial propagation, and permutation scanning for complete, self coordinated coverage.

To protect their network and systems today, enterprises deploy a layered defense model. That includes firewalls, anti-virus systems, access management and intrusion detections systems (IDS), as well as relying on a continuous cycle of patching and reacting to security threats. Defense models have been around for years, and yet to date none have been able to deliver on the final goal of providing full protection against all attacks with little associated cost and annoyance.

Firewalls are vital components in blocking the spreading of malicious activities to and from a given network. The majority of large companies have firewalls in place and security experts still consider they should form the first line of defense in a corporate IT security policy. The currently deployed firewalls can only block a worm if they have the worm specific signature, have the necessary parsing accuracy, or if the worm attempts to use a blocked port or protocol.

Worm signature-based detection systems are based on a network (or per-host), appliance which sits in-line with the network traffic and checks every IP packet against known signatures of worms. Often these solutions also rely on checking traffic flows against bandwidth profiles. Examples of this technology include: Netscreen Intrusion Detection Prevention by Juniper, described at http://www.juniper.net/products/intrusion/, UnityOne by TippingPoint, described at http://www.tippingpoint.com/technology_filters.html and Snort-Inline described at http://sourceforge.net/projects/snort-inline/, to name a few.

Generic in-line Intrusion Prevention Systems (IPS) also rely on signatures and flows measurements to detect and block malicious activities in a network, hence their capabilities are limited in blocking zero-day worms. Moreover, if their detection algorithm is based on statistical observations (e.g. flow's bandwidth, number of active ports per host, etc . . . ) it may take some time before an IPS system can start blocking a worm. Due to this window of time, an enterprise could be held accountable for the spreading of the worm. On the other hand, the proposed invention overcomes the "zero-day" and the "time window" issues by blocking malicious activities with no associated signature at their first attempt.

However, signature and behavior monitoring technologies are not effective the first time a new worm spreads across the Internet, since it is not feasible to setup a policy that recognizes the malicious SW until the attack happens. Signatures and policies can be updated periodically, but only after a worm or other malicious SW has been recognized and studied. Signature monitoring technologies are not effective the first time a new work spreads across the Internet. It is also extremely difficult to distinguish between the identity or behavior of 'good' and 'bad' code. This results in a large number of 'false positives' that limit the purpose of many prevention systems to detecting events rather than protecting against them.

Furthermore, both signature and behavior monitoring techniques allow a time interval between the onset of an attack and its detection, so that by monitoring the behavior of a running application, by the time the destructive behavior is detected, the application is already compromised and the malicious code is already running. This time interval represents a window of vulnerability for a network operating over the attacked access link.

Most importantly, firewalls cannot stop everything; they are configured to allow certain classes or types of data to pass through into the protected network. Every malicious activity that exploits a service allowed through a firewall will successfully spread. As a result, firewalls may no longer be sufficient to protect a corporate network from viruses, system penetration, spoofing, data and network sabotage, and denial of service attacks that exploit vulnerabilities in protocols allowed by a firewall. To address this problem, new techniques are being currently devised.

A DNS (domain name system)-based network security techniques is described by D. White, E. Kranakis, P. C. van Ooschot (School of Computer Science, Carleton University, Ottawa, Ontario, Canada) in the paper entitled "DNS-based Detection of Scanning Worms in an Enterprise Network.", published in the Proceedings of the $12^{th}$ Annual Network and Distributed System Security Symposium, San Diego, USA, Feb. 3-4, 2005. The proposal in this paper is based on monitoring the DNS activity before a new connection is established. A scanning worms uses 32 bit random numbers that correspond to an IP address for the infection attempt, so it does not use the DNS protocol for address translation (from the alphanumeric name to a respective IP address).

The Carleton team uses a Packet Processing Engine (PPE), which is constantly observing network traffic, looking for new outbound TCP connections and UDP packets. The captured traffic is passed onto the DNS Correlation Engine (DCE) where it is checked against recently occurred DNS lookups and a whitelist with legitimate applications and services that do not rely on DNS). If a TCP connection is trying to access the Internet without an associated DNS lookup record, the connection is considered anomalous and the system will raise an alarm. The DCE receives DNS lookup information from the local DNS. It also receives allowed embedded numeric IP addresses from the PPE unit, which is parsing HTTP traffic also for this purpose.

However, the work developed by the Carleton team is limited to worm detection, but does not prevent them from spreading. Obviously one successful malicious connection to a host outside a local network could mean that a worm has successfully spread. This means that even if an enterprise network is using this DNS-based detection mechanism to activate some filters to stop a worm from spreading, the enterprise can still be held accountable for the damage caused by the worm during the window of time from detection to reaction. Moreover, the solution presented by the Carleton team requires one or more network appliances that are capable of analyzing in real time, and through deep packet inspection, all traffic leaving the enterprise at every egress point. Each of these traffic analyzers will have to perform line-rate accurate HTML parsing.

In the scope of Self Defending Network, Cisco has proposed a technology called Network Admission Control (NAC) that mitigates the spreading of worms and similar malicious activities within an enterprise network. The idea relies on the enforcement of security policies on any endpoint connecting to a given enterprise network. Cisco NAC grants network access only to compliant and trusted hosts, and restricts the access of noncompliant hosts. The admission decision can be based on several parameters such as the host's anti-virus state and the operating system patch level. If a host is non-compliant, it can be placed in a quarantine zone or be granted minimal access to the network resources.

Cisco's NAC can be considered an indirect worm confinement methodology. In fact, NAC's goal is to ensure that all machines connected to an enterprise network are running updated antivirus software and the latest OS patches. This does not prevent zero-day worms from propagating from the enterprise to the internet. The security provided by NAC is dependent on the enterprise policies and the accuracy of the antivirus software. Moreover, NAC is useless in all those cases where a patch to a specific worm exists but it has yet to be rolled-out due to operational issues.

Alcatel, Inc. also uses an Automated Quarantine Engine (AQE) which is a solution somewhat similar to NAC, but instead of directly verifying the security policy on hosts joining the network, it relies on information collected from intrusion detection and prevention systems and dynamically re-configures the network to contain malicious activities. Upon detection of an attack, the AQE locates the offender and implements a network response. In the case of a virus or worm attack, the AQE will place the infected device into Alcatel quarantine VLAN that is applied to the edge of the network. Using AQE, the infected device will be blacklisted, even if the infected intruder moves to another location.

However, Alcatel's AQE relies completely on third party Intrusion Detection Systems (IDS) in order to block infected hosts. This solution is limited by the IDS system accuracy and by the need for a worm's signature. Moreover, a worm is still able to infect other hosts outside the enterprise network during the window of time between the detection and the quarantining of the infected host. The extent of this time window largely depends on the detection mechanism used by the third party IDS. The proposed solution does not rely on any third party IDS or on any pre-existing signature to confine malicious activities.

In general, all modern technologies involve combinations of the signatures, policies, or training to distinguish between good and bad code, setup is often complex and takes time to roll out across servers. Ongoing tuning and customization is needed to stay current with the latest vulnerabilities and also to reduce the occurrence of 'false positives' and 'false negatives' identifications of malicious attacks.

The reliability and security of an IP network is essential in a world where computer networks are a key element in intra-entity and inter-entity communications and transactions. Therefore, there is a need to provide a system for confining and detecting malicious activities (e.g. internet worms) in a network that is easy to install and maintain.

SUMMARY OF THE INVENTION

It is an object of the invention to provide a DNS based enforcement system for detection and confinement of network malicious activities, that alleviates totally or in part the drawbacks of the prior art security enforcement and detection systems.

Accordingly, the invention provides a system for detection and confinement of network malicious activities originating from a local host on a local network to a remote host outside of the local network, comprising: a local domain name server (DNS) server for receiving from the local host a request for an outbound connection to the remote host, completing a DNS lookup to obtain the IP address of the remote host, and generating a conformity indication; and a local enforcement unit connected between the local network and the remote host, for blocking establishment of the outbound connection by default, until it receives the conformity indication.

The invention also provides a method for detection and confinement of network malicious activities originating from a local host on a local network to a remote host outside of the local network, comprising the steps of: a) generating a conformity indication in response to a DNS lookup performed by the local host into a local domain name system (DNS) server on the local network, with a view to obtain the IP address of the remote host; b) generating a connection authorization indication using an enforcement unit, based on the conformity indication and a list with specified exceptions including local hosts that are allowed to access specified remote resources without a DNS lookup; and c) blocking establishment of the outbound connection by default, until receipt of the connection authorization indication.

Unlike the Carleton's team DNS based solution described above, the system of the invention does not aim at detecting network malicious activities only, but rather it blocks such activities at their first attempt to leave a given network. Logging blocked outbound connection attempts will also reveal the presence of a malicious activity in the network. Thus, an enterprise network could be relieved from the liability of spreading certain classes of worms (namely the ones not performing DNS look ups) across the internet, and at the same time could become promptly aware when malicious activities are taking place.

In this way, the invention has the double benefit of preventing and detecting the spreading of malicious activities outside a local network. The advantages of detecting malicious activities in a network are obvious and will not be discussed further. The advantages of preventing the spreading of network malicious activities are twofold. Firstly, in the case of larger networks, which are logically partitioned in cells, preventing the spreading of a malicious activity will mean that only one cell is compromised rather than the whole network. Secondly, an enterprise may be held accountable from a civil law standpoint for propagating a worm if no confinement mechanism is deployed. The confinement and detection of malicious network activities may prove to be a value-added differentiator in the network equipment market.

Another advantage of the system of the invention is that it does not rely on signatures, which could become operationally overwhelming when dealing with large and ever changing cases of malicious activities, nor it requires the associated burden of producing and keeping the signatures updated. It also does not rely on cumbersome elements and techniques such as network "sniffers", but relies solely on the knowledge already available within standard proxies and firewalls. Moreover, the proposed solution does not need to accurately parse all HTTP messages looking for embedded numerical IP addresses that will trigger exceptions as required by the Carleton's team DNS based solution.

The proposed invention could be complementary to a solution like NAC, since it can effectively block zero-day malicious network activities.

Finally, the presented solution is not bound to any specific implementation, making the idea an extremely flexible and advantageous solution to own.

BRIEF DESCRIPTION OF THE DRAWINGS

The foregoing and other objects, features and advantages of the invention will be apparent from the following more particular description of the preferred embodiments, as illustrated in the appended drawings, where:

FIG. 3 illustrates a block diagram of another embodiment of the a DNS-based enforcement system that uses a proxy.

DETAILED DESCRIPTION

In the following, the term 'network malicious activities' refer to worms, viruses, mass mailing worms, automated attack tools—DDoS zombies, covert channels used by Remote Access Trojans, or similar threats, that pose a security hazard to a network and its operation. By 'local network', we mean a confined network environment which relies on one or more local DNS servers and with one or more protected accesses to another network, e.g. Internet.

Figure 1:
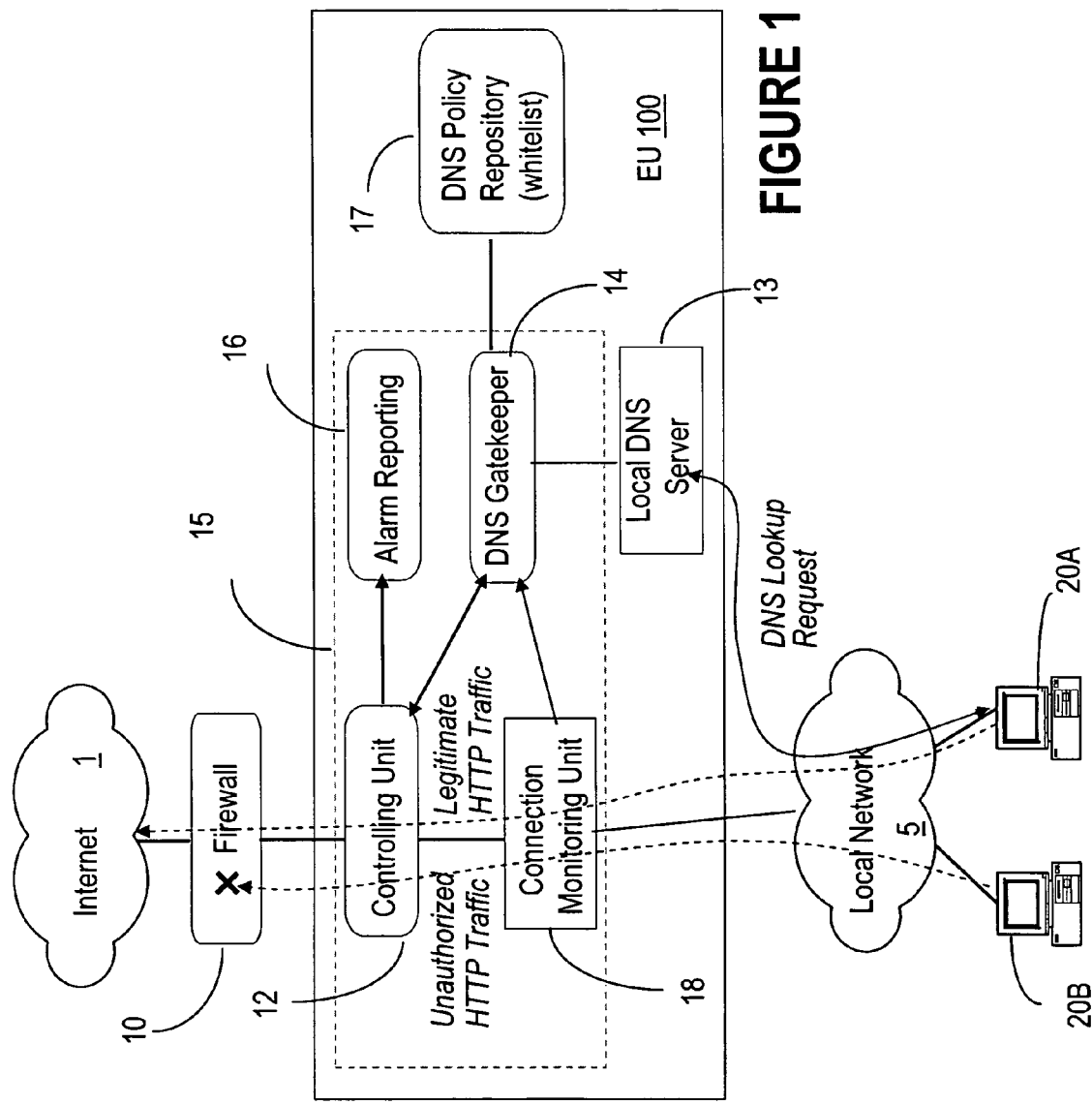
FIG. 1 shows a block diagram of an embodiment of the DNS-based enforcement system according to the invention.

FIG. 1 shows the block diagram of an embodiment of the DNS-based enforcement system 100 according to the invention. In this example, hosts 20A, 20B of a local network 5 connect to the Internet 1 via an enforcement unit 15. Hosts 20A and 20B can access both 'inside' and 'outside' resources of interest. The system 100 requires that every connection toward a resource located outside the local network is blocked by default by the local enforcement unit 15.

FIG. 1 also shows the DNS server 13 which provides the mapping between numeric IP addresses of nodes/hosts and the corresponding alphanumeric name, for each legitimate outbound connection request. System 100 is based on the concept that malicious network activities do not make use of the DNS protocol to reach remote targets outside a local network. When DNS server 13 receives a lookup request, it will issue a conformity indication to the enforcement unit, to indicate that the request for an outbound connection from a host on the local network 5 refers to a legitimate connection.

In the embodiment of FIG. 1, enforcement unit 15 includes a firewall 10, a controlling unit 12, a DNS gatekeeper 14, a connection monitoring unit 18 and an alarm reporting unit 16. As indicated above, a standard firewall can only block a worm for which it has a specific signature, or if the worm attempts to use a blocked port or protocol; every malicious activity that exploits a service allowed through such a standard firewall will successfully spread. Firewall 10 however does not require signatures (and keeping the signatures updated) in order to operate in conjunction with the system in FIG. 1, nor does it rely on network "sniffers", nor does it need to parse HTML messages looking for embedded numerical IP addresses. Moreover, firewall 10 can retain all the functions and features (including signature based blocking) of common industry available firewalls. Controlling unit 12 notifies the firewall 10 about which outbound connection, among all the ones using legitimate protocols, is authorized to go through, based on information from the DNS gatekeeper 14.

The connection monitor identifies to the gatekeeper 14 each outbound connection, and DNS gatekeeper 14 identifies if the outbound connection did perform a DNS query or not. Outbound connections are allowed to leave the local network only when authorized directly by the DNS gatekeeper 14; the DNS gatekeeper issues a connection authentication indication on receipt of the conformity indication received from the DNS server 13. With some exceptions discussed later, DNS gatekeeper 14 issues the connection authentication indication to controlling unit 12 to allow the respective connection over the firewall only if the connection setup involved a DNS lookup. DNS gatekeeper 14 uses any suitable protocol for communication with the controlling unit 12, which could be for example the MidCom protocol.

Let's assume that host 20A tries to legitimately access resources outside the local network 5; gatekeeper is advised by monitor 18 of the new connection. In order to retrieve the numeric address of a remote resource of interest, host 20A initiates a valid DNS lookup. The DNS server 13 responds to host 20A with the numeric IP address of the remote resource and also signals to the DNS gatekeeper 14 that this request is legitimate, by issuing the conformity indication signal. At this point the DNS Gatekeeper 14 instructs the firewall 10 through controlling unit 12 to allow an outbound connection from host 20A toward the requested remote numeric IP address.

In the case of an infected network host, which is host 20B in the example of FIG. 1, the malicious software residing on this host, (a worm, etc.) will try to spread by infecting other machines. In order to do so, the worm will need to generate IP addresses of potential remote targets, which is done currently directly, without performing a DNS lookup first. Hence, host 20B will attempt to connect to a remote resource without generating a DNS request. Since no traffic is allowed through the local firewall 10 without an explicit permission of the DNS Gatekeeper 14, the connection from host 20B will be considered a malicious activity and dealt with according to a given policy. Now, alarm reporting unit 16 signals denial of this outbound connection.

Preferably, all malicious connection attempts are immediately terminated without further processing. In this way, system 100 could be configured to block all malicious activities that exploit allowed network services, but do not make legitimate DNS requests prior to connecting to a remote resource. Alternately, the enforcement unit 15 may request to the application that has initiated the suspicious outbound connection to authenticate itself.

There are however legitimate connections that do not require a prior DNS lookup. These may include for example peer to peer traffic, remote administration tools and local clients of network services with embedded IP addresses. To address these scenarios, this invention proposes the use of a DNS policy repository 17, which deals with legitimate exceptions of connections without an associated DNS record. Repository 17 simply contains a whitelist of local hosts with protocols and ports that are allowed to access remote resources without a DNS lookup. Repository 17 could also be based on more sophisticated approaches. Before denying a new connection signaled by the connection monitoring unit 18, bur for which no conformity signal has been received from DNS server 13, DNS gatekeeper 14 consults the DNS policy repository 17. The connection authentication indication is nonetheless issued if the port/protocol associated with that connection is included in the whitelist. System 100 is however vulnerable to worms exploiting services listed under the whitelist in the DNS Policy Repository 17. (e.g. Peer-to-Peer worms if the service is allowed).

There are other types of legitimate exceptions that could violate the assumption that outbound connections must perform a DNS lookup first. Two of these are addressed directly by system 100 without any additional component. The first is the case of local users trying to access remote resources directly by using their numeric IP addresses, and the second is the case of a webpage "outsourcing" some of its content to a remote server. In this second case, the HTML code for the page may contain the IP numeric address for a remote server hosting part of the web-page content such as pictures. All the HTTP requests resulting from either scenario will look as a malicious activity, since they are new TCP connections towards IP addresses for which there is no associated DNS request record. Connection monitoring unit 18 recognizes these connections and forces the controlling unit 12 to instruct the firewall 10 to allow the respective outbound connection, in the absence of the connection authentication indication generated by the DNS gatekeeper 14.

In order to solve this problem, the connection monitoring unit 18 monitors the TCP connection establishment process. TCP uses the so-called Three-way-handshake initialization process before actually transferring any payload data. In a simplified way, the TCP three-way-handshake process can be described as follows. At the beginning a host wishing to initiate a TCP connection to a remote host issues a SYN packet containing certain parameters. The remote host receives the SYN and responds with a different SYN messages that also acknowledges the previous SYN. Finally, the initiator host responds with a final acknowledgement message (ACK) and potentially already starts to append some payload data in the message. After detecting a TCP connection to a numeric IP address without an associated DNS record, unit 18 lets the first outbound TCP SYN packet go through the respective connection. Then, after receiving the inbound SYN/ACK, there will be an outbound ACK, from the local host, with some payload. At this point, if the controlling unit detects that the payload is an HTTP GET command, will instruct the firewall 10 to let the rest of this TCP flow go through. If the payload is not an HTTP GET, then the enforcement unit 15 will assume that the connection attempt is malicious and it will block the connection. Optionally, the connection monitoring unit 18 may send a TCP RESET to the remote party on behalf of the malicious application.

Due to unforeseeable yet legitimate non-standard application behaviors, there maybe the need to postpone the decision about an outbound connection until the first useful payload is sent from the local network towards the outside. For example, a given legitimate application, needing to access a remote resource, could send a TCP SYN packet, wait for the remote TCP ACK, then send an empty TCP SYN/ACK packet, wait for the second remote TCP ACK and only then send the real payload.

Also, the enforcement unit 15 may be designed to continue monitoring a recently established TCP connection to make sure that there is a meaningful response to the outbound HTTP GET, i.e. that the other side of the connection is really a web server and not some other network service to which a worm has sent an initial fake HTTP GET. It is important to note that such task is well in the capabilities of current HTTP proxies, and it is a quite different effort than sniffing network traffic and parsing it accurately for arbitrary matches in the HTML code as required by the Carleton's group proposal.

System 100 is thus vulnerable to the case of a worm capable of spreading itself through a single HTTP GET instruction. However, mechanisms to guard against this very specific potential threat are not difficult to implement if need be.

The enforcement unit 15, may also be enabled with a detection component, for logging blocked outbound connection attempts and reporting the offending host, the used protocol and ports, and the remote destination of the connection to the DNS gatekeeper 14, or to an Intrusion Detection System (not shown). Such a detection feature is not mandatory in order to confine malicious activities on a local network.

Figure 2:
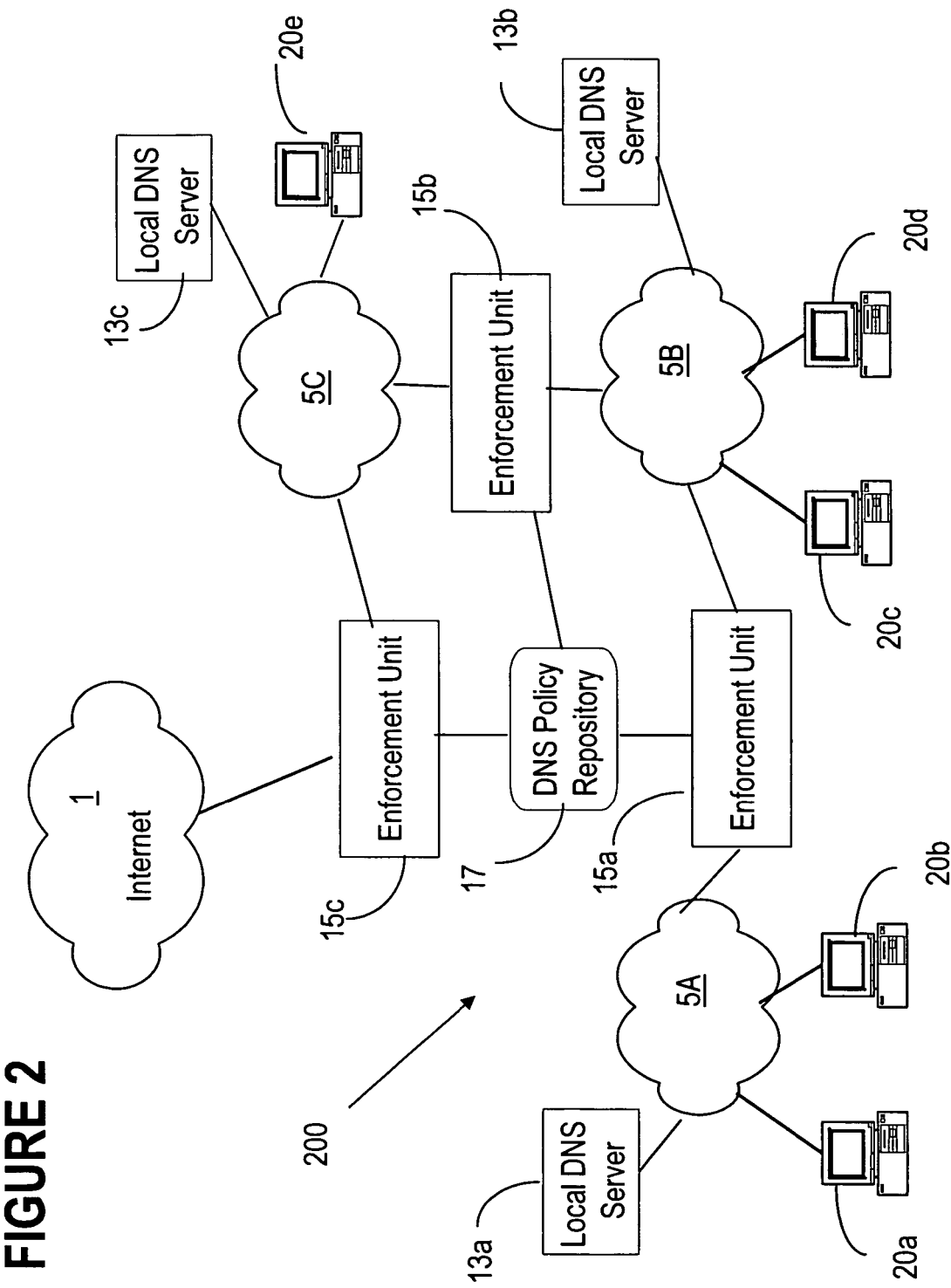
FIG. 2 shows a block diagram of a DNS-based enforcement system where the local network is separated into cells.

As indicated above, malicious activities occurring in a given local network 5 will not be detected until an attempt is made to make a connection to a numeric IP address outside the local network. Thus, in order to speed up the detection of a worm within the local network, a configuration as shown in FIG. 2 may be used. In this case, the local network is subdivided into cells 5A, 5B, 5C each cell making use of a local DNS server 13a, 13b, 13c, etc. and every network host/resource in a given cell makes use of the respective local DNS server. A malicious application, such as a worm, trying to spread from one cell to another, within a larger enterprise domain, will be blocked and detected promptly protecting all other cells in the enterprise from being infected. This type of deployment scenario where the local network is separated into smaller network cells is already common in today's larger enterprise networks. According to the invention, in this case, the enforcement units 15a, 15b, etc. are deployed between cells, and at the access to the external network.

The case of a proxy server that performs DNS requests on behalf of local network applications is considered next. In this case the enforcement unit (the proxy) has all the knowledge to make blocking decisions available; there is no need for a separate DNS Gatekeeper, as shown in FIG. 3. All outbound connection attempts to numeric IP addresses will be considered suspicious and blocked, while all outbound connections carrying valid domain names will be allowed.

It is quite possible that worms may be designed in the future with a view to circumvent the above solutions, by performing a preemptive valid DNS request before each connection attempt. However, this worm design technique will add significant drawbacks to the efficiency of a worm, such as the need for the worm to generate valid domain names rather than random numeric IP addresses and the need to obtain the local DNS server address. Moreover, this technique will slow down the worm propagation by many folds and have a significant impact on the local DNS server. Finally the number of remote resources that a worm could compromise will be severely limited. In fact, only remote hosts that are bound to a qualified domain name will now be reachable. This will exclude most home broadband users and client systems in enterprise networks behind a NAT.

I claim:

1. A system for detection and confinement of network malicious activities originating from a local host on a local network to a remote host outside of said local network, comprising:
 a local domain name system (DNS) server connected to said local network, configured to:
  receive from said local host a request for an outbound connection to said remote host,
  complete a DNS lookup to obtain an IP address of said remote host, and
  generate a conformity indication when said request for said outbound connection refers to a legitimate connection;
 a DNS policy repository configured to enable select requests from the local host to access specified remote resources without the DNS lookup;
 a DNS gatekeeper to generate a connection authorization indication based on said conformity indication; and
 a local enforcement unit connected between said local network and the remote host configured to block-establishment of said outbound connection by default, until it receives said connection authorization indication.

2. The system of claim 1,
 wherein the DNS policy repository includes a list of specified exceptions, including at least local hosts allowed to access specified remote resources without the DNS lookup.

3. The system of claim 2, wherein said specified exceptions further include at least:
 connections carrying peer-to-peer traffic;
 connections from a local host with an embedded IP address; and
 remote administration tools.

4. The system of claim 1, wherein said local enforcement unit comprises:
 a controlling unit configured to:
  block said connection until receipt of said connection authorization indication, and
  finally reject said request in the absence of said connection authorization indication;
 a connection monitoring unit configured to:
  determine if said outbound connection is a legitimate connection, and
  instruct said control unit to enable said outbound connection in the absence of said connection authorization indication when said outbound connection is a legitimate connection.

5. The system of claim 4, wherein said outbound connection is a legitimate connection when said local host hosts legitimately uses a numeric IP address.

6. The system of claim 4, wherein said controlling unit, to allow or block said outbound connection, controls a standard firewall configured to protect against non-authorized users.

7. The system of claim 1, wherein said outbound connection is a legitimate connection when said local host transmits a web page to a remote server.

8. The system of claim 1, wherein said local enforcement unit further comprises:
 a proxy server configured to:
  block said outbound connection, and
  unblock said outbound connection when said outbound connection carries a valid domain name request based on said conformity indication; and
 an alarm reporting unit to rise an alarm when said request is finally blocked by said controlling unit, wherein said proxy server allows said outbound connection when said domain name is valid.

9. The system of claim 1 further comprising:
 means for:
  logging blocked outbound connections, and
  reporting all local hosts that requested the respective blocked connections.

10. A method for detection and confinement of network malicious activities originating from a local host on a local network to a remote host outside of said local network, comprising:
 generating a conformity indication in response to a completed DNS lookup performed by a local domain name system (DNS) server connected to said local network in response to a request received from said local host for an outbound connection to said remote host, with a view to obtain an IP address of said remote host, wherein said conformity indication indicates that said request for said outbound connection refers to a legitimate connection;
 generating a connection authorization indication using an enforcement unit based on said conformity indication and a list of specified exceptions, said list including at least local hosts allowed to access specified remote resources without the DNS lookup; and
 blocking establishment of said outbound connection by default until receipt of said connection authorization indication.

11. The method of claim 10, further comprising:
 monitoring the connection establishment process for said outbound connection to determine if said outbound connection is a legitimate connection; and
 establishing said outbound connection in the absence of said connection authorization indication when said outbound connection is a legitimate connection.

12. The method of claim 11, wherein said outbound connection is a legitimate connection when said local host transmits a web page to a remote server.

13. The method of claim 12, wherein said monitoring step comprises:
- identifying an acknowledgement message received by said local host from said remote host after an exchange of SYN messages;
- accessing the message in a first payload packet transmitted by said local host after receipt of said acknowledgement message; and
- flagging said connection as a legitimate connection when the message in said first payload packet is a HTTP GET command.

14. The method of claim 13, further comprising:
- sending a TCP RESET message to said remote host to terminate said connection establishment process when the message in said first payload packet is not a HTTP GET command.

15. The method of claim 13, further comprising:
- monitoring said outbound connection once established to determine when the response to said HTTP GET command indicates that said remote host is web server.

16. The method of claim 10, further comprising:
- dividing said local network into cells; and
- equipping each cell with a respective local DNS server and an enforcement unit to confine spreading of a malicious activity within a cell.

17. The method of claim 10, further comprising:
- finally blocking establishment of said outbound connection in the absence of said connection authorization indication; and
- raising an alarm whenever said request is finally blocked.

18. The method of claim 17 further comprising:
- logging all finally-blocked outbound connections; and
- reporting all local hosts that requested the respective blocked connections.

19. The method of claim 10, wherein said specified exceptions include:
- at least connections carrying peer-to-peer traffic,
- remote administration tools, and
- connections from a local host with an embedded IP address.

* * * * *